United States Patent [19]

Bremer

[11] Patent Number: 5,513,212
[45] Date of Patent: Apr. 30, 1996

[54] CONVERSION OF A FAX MODULATION TO A DATA MODULATION

[75] Inventor: Gordon Bremer, Clearwater, Fla.

[73] Assignee: AT&T Corp., Murray Hill, N.J.

[21] Appl. No.: 151,689

[22] Filed: Nov. 15, 1993

[51] Int. Cl.⁶ .......................... H04L 25/00; H04L 27/00; H04N 1/00; H04M 11/00
[52] U.S. Cl. ................ 375/222; 358/434; 358/442; 379/93; 379/100
[58] Field of Search ................ 375/4, 5, 7, 8, 375/222, 226, 211; 358/434, 435, 436, 438, 439, 442; 379/93, 97, 98, 100

[56] References Cited

U.S. PATENT DOCUMENTS

| | | | |
|---|---|---|---|
| 4,215,243 | 7/1980 | Maxwell . | |
| 4,476,496 | 10/1984 | Thaler | 379/100 |
| 4,878,228 | 10/1989 | Takahashi | 375/211 |
| 4,931,250 | 6/1990 | Greszczuk | 375/8 |
| 4,974,099 | 11/1990 | Lim et al. . | |
| 5,036,513 | 7/1991 | Greenblatt . | |
| 5,065,427 | 11/1991 | Godbole | 379/98 |
| 5,123,033 | 6/1992 | Beck | 375/4 |
| 5,187,591 | 2/1993 | Guy et al. . | |
| 5,208,850 | 5/1993 | Kino . | |
| 5,233,627 | 8/1993 | Kozima et al. | 375/8 |
| 5,251,217 | 10/1993 | Travers et al. . | |

FOREIGN PATENT DOCUMENTS

| | | | |
|---|---|---|---|
| 0496427 | 7/1992 | European Pat. Off. | H04M 11/06 |
| 0539219A2 | 4/1993 | European Pat. Off. | H04M 11/06 |

*Primary Examiner*—Edward L. Coles, Sr.
*Assistant Examiner*—Thomas D. Lee
*Attorney, Agent, or Firm*—Joseph J. Opalach

[57] ABSTRACT

A simultaneous voice and data (SVD) modem is coupled to both a fax machine, which includes a fax modem, and a telephone set. When the fax machine initiates a fax-call, the SVD modem emulates signaling of the local loop. This allows the fax machine to operate without requiring modifications to the fax machine. After establishing a data connection with a far-end SVD modem, the near-end SVD modem demodulates the fax modulation signal from the fax machine to recover the fax data. The fax data is then re-modulated using a data modulation technique for transmission to the far-end SVD modem. The latter, demodulates the data portion of the signal to recover the fax data, which is then re-modulated using a fax modulation technique for transmission to a far-end fax machine.

8 Claims, 3 Drawing Sheets

CALLING SIGNAL

| SIGNAL NAME | TONE 1 | TONE 2 | SYMBOL RATE INDICATED |
|---|---|---|---|
| SVD CNG-a | 1550Hz @ -3dB | 825Hz @ -3dB | 3000 s/s |
| SVD CNG-b | 1550Hz @ -3dB | 875Hz @ -3dB | 2800 s/s |
| SVD/FAX CNG-a | 1100Hz @ -1dB | 825Hz @ -7dB | 3000 s/s |
| SVD/FAX CHG-b | 1100Hz @ -1dB | 875Hz @ -7dB | 2800 s/s |

ANSWER IDENTIFICATION SIGNAL*

| SIGNAL NAME | TONE 1 | TONE 2 | SYMBOL RATE INDICATED |
|---|---|---|---|
| SVD AID-a | 1000Hz @ -3dB | 801Hz @ -3dB | 3000 s/s |
| SVD AID-b | 1000Hz @ -3dB | 850Hz @ -3dB | 2800 s/s |

*FOLLOWED BY STANDARD 2100Hz ANSWER TONE 5,513,212

1

CONVERSION OF A FAX MODULATION TO A DATA MODULATION

BACKGROUND OF THE INVENTION

The present invention relates to data communications equipment and, more particularly, to the use of a facsimile machine in a simultaneous voice and data communications system.

The co-pending, commonly assigned, U.S. Patent application of Gordon Bremer and Kenneth D. Ko entitled "Simultaneous Analog and Digital Communication," Ser. No. 08/076505, filed on Jun. 14, 1993, describes a simultaneous voice and data communications system in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem. This form of modulation is hereinafter referred to as simultaneous voice and data (SVD) modulation.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

Unfortunately, any data communications equipment that uses the SVD modulation technique is not compatible with existing modulation standards for facsimile (fax) machines, i.e., fax modems, and standard data modems. For example, a fax modem may conform to International Telegraph and Telephone Consultative Committee (CCITT) standards T.4 and T.30, which define modulation, start-up, and handshaking signaling, etc., that is different from the above-mentioned simultaneous voice and data modulation technique.

SUMMARY OF THE INVENTION

In accordance with the invention, I have realized an advantageous method and apparatus that allows an SVD modem to transmit and receive a fax signal. In particular, the SVD modem first demodulates the fax signal to recover the fax data, which is then re-modulated for transmission to a far-end SVD modem.

In an embodiment of the invention, a near-end SVD modem is coupled to both a fax machine, which includes a fax modem, and a telephone set. When the fax machine intends to connect a fax call, the near-end SVD modem emulates signaling of the telephone network. This allows the fax machine to operate without requiting modifications to the fax machine. The near-end SVD modem then connects the fax call to a far-end SVD modem and provides identification signals to the far-end SVD modem. These identification signals alert the far-end SVD modem that it is about to communicate a voice and data signal, where the data signal represents fax data.

After establishing a data connection with the far-end SVD modem, the near-end SVD modem demodulates the fax signal from the fax machine to recover the fax data. The fax data is then re-modulated using SVD modulation for transmission to the far-end SVD modem. The latter, demodulates the data portion of the received SVD signal to recover the fax data, which is then again re-modulated using a fax modulation technique for transmission to a far-end fax machine.

DETAILED DESCRIPTION

Figure 1:
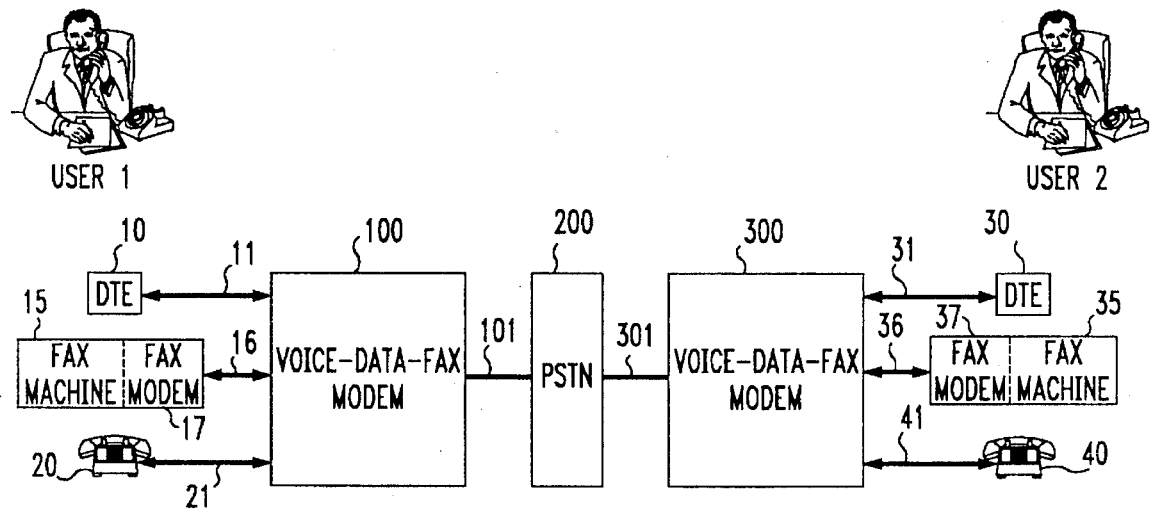
FIG. 1 shows a block diagram of a simultaneous voice and data communications system embodying the principles of the invention.

A block diagram of a simultaneous voice and data communications system is shown in FIG. 1. The communications equipment of user 1 includes data terminal equipment (DE) 10, telephone 20, fax machine 15, and voice-data-fax modem 100. The latter may receive three different types of signals for transmission—a data signal from DTE 10, a fax signal from fax machine 15, and a voice signal from telephone 20. As described below and in accordance with the principles of the invention, voice-data-fax modem 11210 provides an SVD signal for transmission, via local loop 101, public switched telephone network (PSTN) 200, and local loop 301, to voice-data-fax modem 300. Local loop 101, PSTN 200, and local loop 301 represent a communications channel between the voice-data-fax modems. In this embodiment, it is assumed that only the data signal or the fax signal is modulated for transmission along with the voice signal. In other words, there is no simultaneous transmission of both the fax signal and the data signal by voice-data-fax modem 100. Voice-data-fax modem 300 receives and demodulates the SVD signal to provide the voice signal to telephone 40 and, either, the data signal to DTE 30 or the fax signal to fax machine 35. Transmission of voice, data, and fax, signals in the opposite direction to voice-data-fax modem 100, occur in a like fashion. In the description that follows only voice-data-fax modem 100 is described, however, it is assumed that voice-data-fax modem 300 also incorporates the inventive concept.

Figure 2:
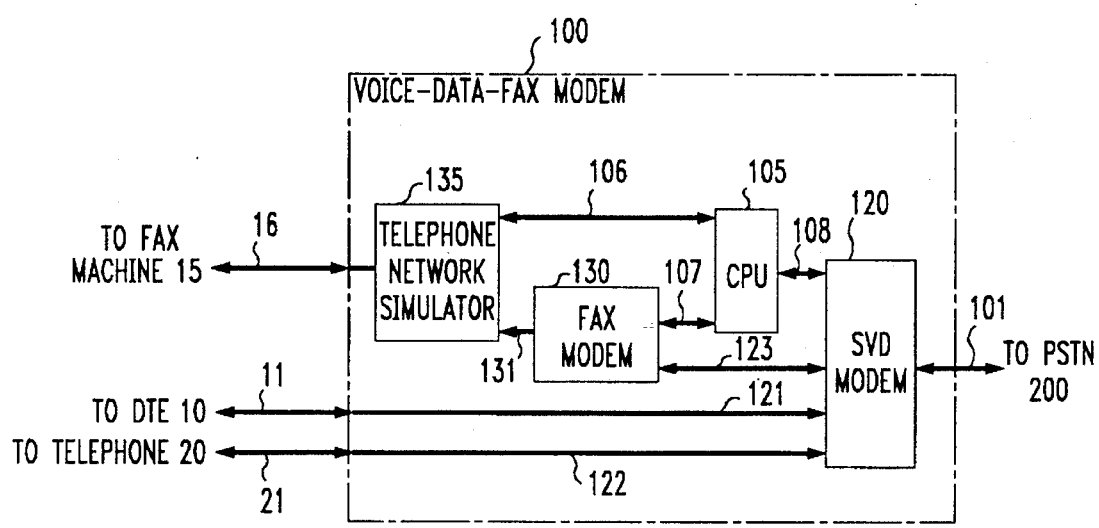
FIG. 2 shows a block diagram of the voice-data-fax modem of FIG. 1 embodying the principles of the invention.

A block diagram of voice-data-fax modem 100, which embodies the principles of the invention, is shown in FIG. 2. Voice-data-fax modem 100 comprises CPU 105, telephone network simulator 135, fax modem 130, and SVD modem 120. Other than the inventive concept and SVD modem 120, the individual components of voice-data-fax modem 100 are well-known and are not described in detail. For example, CPU 105 is a microprocessor-based central processing unit and associated memory for storing program data; telephone network simulator 135, as further described below, provides well-known signaling functions like busy tone, ring-back, etc.; and fax modem 130 operates in accordance with CCITT standards T.4 and T.30 for fax machines. Finally, the basic operation of SVD modem 120 is described in the above-mentioned Bremer et al. patent application entitled "Simultaneous Analog and Digital Communication," Ser. No. 08/076505, filed on Jun. 14, 1993, which is hereby incorporated by reference.

As described in the above-mentioned Bremer et at. patent application, a modem that supports SVD modulation receives a data signal from a local DTE and encodes the data signal to provide a stream of data symbols. A voice signal is then encoded and added to each respective data symbol to provide a stream of signal points. This stream of signal points is then modulated, e.g., via quadrature amplitude modulation (QAM), for transmission to a far-end SVD-compatible modem. However, when user 1 wants to send a fax to user 2, a modem that supports SVD modulation is not compatible with a fax machine, which itself modulates a data signal according to the above-mentioned CCITT standards. This requires user 1 to acquire a second telephone line to support any fax transmission. Therefore, and in accordance with the inventive concept, a modem that supports SVD modulation is modified to transmit and receive fax information as the underlying data signal. In particular, voice-data-fax modem 100 first simulates the telephone network signaling to fax machine 15, then voice-data-fax modem 100 demodulates a fax signal, from fax machine 15, to recover the fax data. This fax data is then re-modulated by voice-data-fax modem 100 for transmission to a far-end SVD modem as the data pan of an SVD signal. As a result, simultaneous fax and voice transmission is achieved and only one telephone line is required to PSTN 200.

In the description that follows it is assumed that a simultaneous voice and data communications path has already been established between user 1 and user 2 of FIG. 1, i.e., between voice-data-fax modems 100 and 300. Consequently, voice-data-fax modems 100 and 300 are each using the SVD modulation technique to transmit to, and receive from, each other an SVD signal that represents a voice signal added to an underlying data signal. As a result, user 1 and user 2 are having a voice conversation and are able to send data to each other over a single telephone line.

When user 1 wants to send a fax to user 2, user 1 enters a document into fax machine 15 for transmission to user 2. Fax machine 15 converts this document into fax data, which is then modulated by fax modem 17 for transmission to another fax machine. Fax modem 17 is coupled to voice-data-fax modem 100 by line 16, which represents a "tip/ring" interface typically found in a local loop environment Telephone network simulator 135 of voice-data-fax modem 100 receives line 16. Telephone network simulator 135 allows voice-data-fax modem 100 to appear to fax machine 15 as the telephone network, i.e., telephone network simulator 135 performs the normal functions of the PSTN 200 "as viewed" from fax machine 15. As a result, no modifications are required to be made to fax machine 15 to work with the inventive concept. Telephone network simulator 135 provides a set of well-known telephone signaling functions like the ability to sense off-hook, provide loop cent, provide dial tone, detect dialing (pulse or DTMF), respond with a ringing signal, busy signal etc. Since these functions and their implementation are well-known, they are not described in detail. Telephone network simulator 135 provides status and information to, and receives control signals from, CPU 105 via line 106. For example, line 106 conveys an "off-hook" indication from fax machine 15, any digits that were dialed, etc., to CPU 105. Similarly, CPU 105 controls telephone network simulator 135, via line 106, to provide ringing, etc., to fax machine 15.

Fax modem 17 conforms to the CCITF standards for fax signaling like T.4 and T.30. Consequently, the signal that fax machine 15 provides on "tip-ring" line 16 is a fax signal. Telephone network simulator 135 of voice-data-fax modem 100 conveys this signal to fax modem 130. The latter is similar to fax modem 17 located within fax machine 15 in that it also conforms to the well-known CCITt fax standards like T.4 and T.30. Fax modem 130 demodulates the fax signal received from fax machine 15 and provides the fax data, via line 123, to SVD modem 120. This fax data is similar to the data signal from DTE 10. In other words, the data modulated by SVD modem 120 now represents fax information as opposed to information from data terminal 10. SVD modem 120 modulates the fax data to provide an SVD signal on line 101, which also includes any voice signal from user 1.

Complementary functions are performed by voice-data-fax modem 100 when receiving an SVD signal that carries fax information. When an SVD signal is received from line 101 that includes fax data, SVD modem 120 demodulates the received SVD signal to provide a data signal on line 123 to fax modem 130 and a voice signal on line 122 to telephone 20. The data signal, which represents the fax information, is then re-modulated by fax modem 130 to provide a fax signal to fax machine 15 via telephone network simulator 135.

Figures 3, 4:
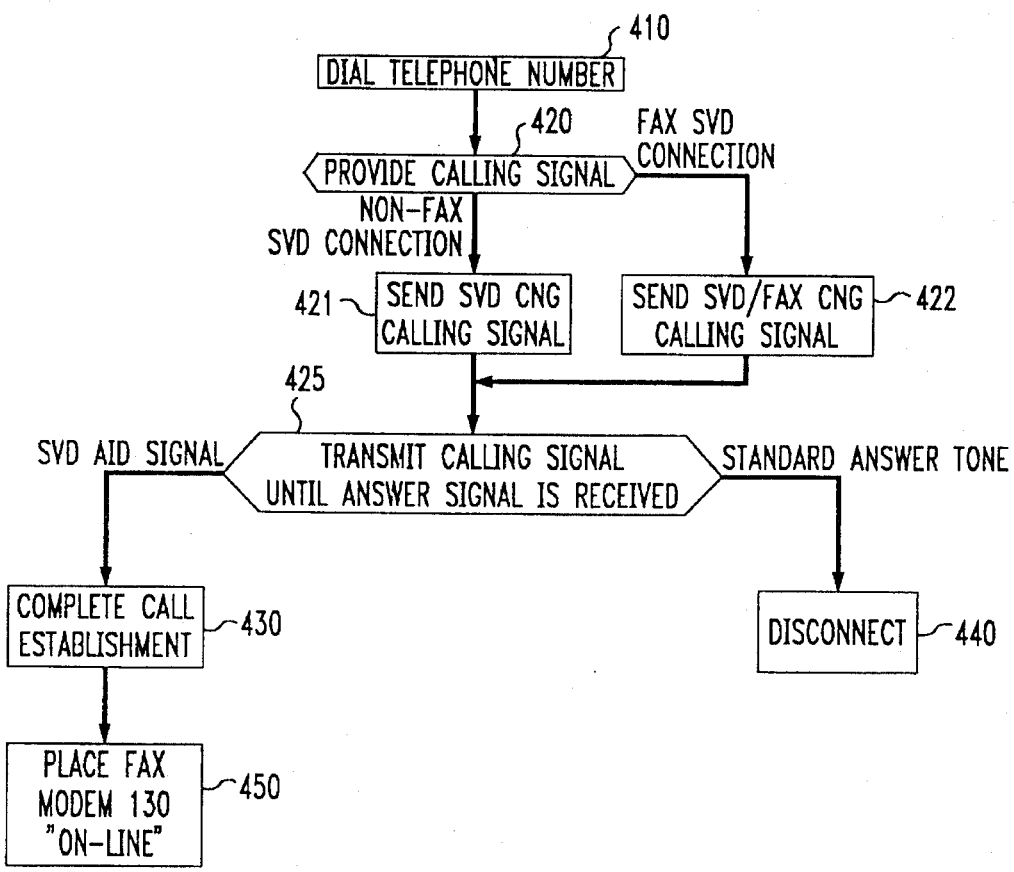
FIG. 3 shows a table of illustrative hand-shaking tones for use in the simultaneous voice and data communications system of FIG. 1.
FIG. 4 shows an illustrative method for use in a calling SVD-compatible modem for establishing a simultaneous voice and fax connection.

In the above description, it was assumed that an SVD connection already existed in describing the general inventive concept. However, during the establishment of this SVD connection, it is necessary to signal the far-end SVD modem, i.e., voice-data-fax modem 300, as to what type of data signal is transmitted within the SVD signal. This type of notification allows the receiving SVD modem to switch to a fax mode of operation and enable its fax modem when the clam portion of an SVD signal is, in reality, conveying fax information. Consequently, voice-data-fax modem 100 uses a set of distinctive identification, or hand-shaking, signals as shown in FIG. 3. These hand-shaking signals include a calling signal, which include calling tones, and an answer identification signal.

Voice-data-fax modem 100 uses the calling signal at the beginning of a calling sequence. Reference should now be made to FIG. 4, which illustrates an illustrative handshaking method that uses the hand-shaking signals of FIG. 3. At the beginning of the initiation of a data connection, voice-data-fax modem 100 dials by going "off-hook" and provides a sequence of dual tone multi-frequency (DTMF) signals on local loop line 101 in step 410. These DTMF signals, as known in the art, represent the telephone number of voice-dam-fax modem 300, and are provided by fax machine 15, via telephone network simulator 135, to CPU 105 of voice-dam-fax modem 100. It should be noted that for simplicity it is assumed that fax machine 15 initiates the telephone call. However, telephone 20, DTE 10, or voice-data-data modem 100, can all equivalently initiate the call and provide the telephone number. For example, voice-data-fax modem 100 can store a telephone number, for subsequent use by fax machine 15 whenever fax machine 15 goes off-hook. After sending the telephone number in step 410, voice-data-fax modem 100 provides a calling signal on line 101 in step 420. The calling signal is one of the four calling tone signals shown in FIG. 3.

Although, generally speaking, calling tones are well-known in the modem art, the calling tones provided by voice-data-fax modem 100 are different in two respects. First, each pair of calling tones is identified with a particular mode of operation. And, second, each pair of calling tones is further associated with a particular symbol rate. Consequently, an answering modem that supports SVD modulation can immediately detect a) if the calling modem supports SVD modulation; b) the type of SVD signal, e.g., data and voice, or fax and voice; and c) the highest requested symbol rate from the calling modem.

The type of calling signal provided by voice-data-fax modem 100 depends on the type of SVD connection desired. As shown in FIG. 3, there are two calling tones identified as "SVD CNG." Either SVD CNG-a or SVD CNG-b are provided whenever voice-data-fax modem 100 is attempting to originate a non-fax SVD connection with a far-end SVD-compatible modem. The particular SVD CNG calling signal provided by voice-data-fax modem 100 is a further function of the desired symbol rate. SVD CNG-a represents a requested symbol rate of 3000 symbols/second (s/sec.), while SVD CNG-b represents a 2800 s/sec. symbol rate. The cadence of the SVD CNG calling signal is 0.5 seconds on and 2.35 seconds off, repeating. This provides a cycle time of 2.85 sec. Referring back to FIG. 4, if voice-data-fax modem 100 desires a non-fax SVD connection, an SVD CNG calling signal is transmitted in step 421.

However, in this example, since voice-data-fax modem 100 is attempting to send a fax to an opposite SVD endpoint, either calling signal identified as SVD/FAX CNG-a, or SVD/FAX CNG-b, is transmitted in step 422. CPU 105 switches to this fax mode of operation upon the detection, via telephone network simulator 135, of fax machine 15 going off-hook. Similar to the SVD CNG tones, SVD/FAX CNG-a requests a symbol rate of 3000 s/sec., while SVD/FAX CNG-b requests a symbol rate of 2800 s/sec. The cadence of this signal is 0.5 seconds on and 3.00 seconds off, repeating (similar to CCITT standard T.30 for fax).

While transmitting the calling signal, voice-data-fax modem 100 waits for the detection of an answer signal in step 425. Upon detection of any answer signal, voice-data-fax modem 100 stops transmission of the calling signal. Although not shown, it should be noted that voice-data-fax modem 100, as known in the art, does not wait forever for the answer signal. If the answer signal does not arrive within a predefined time, voice-data-fax modem 100 will disconnect from line 101.

If an SVD-compatible modem, e.g., voice-data-fax modem 300, answers the telephone call, the answer signal is an SVD answer identification signal (SVD AID) as defined in FIG. 3. Like the above-mentioned SVD calling signal, reception of either SVD AID-a, or SVD AID-b, indicates to voice-data-fax modem 100 that the answering modem is an SVD-compatible modem. Further, the particular type of SVD AID signal received completes the negotiation process for the symbol rate between the calling and answering SVD-compatible modems. Reception of SVD AID-a results in a symbol rate of 3000 s/sec., while reception of SVD AID-b results in a symbol rate of 2800 s/sec. The SVD AID signal is initiated by an SVD-compatible answering modem at the beginning of the silence part of the SVD CNG signal cadence. The cadence of the SVD AID signal is 0.5 sec. on and 0.5 sec. off, followed immediately by the industry standard 2100 Hz answer tone as defined in CCITY V.25. The standard answer tone is provided to disable the echo suppressors and cancelers of PSTN 200 as is known in the art.

When the SVD AID signal is detected, voice-data-fax modem 100 goes to step 430 to perform a training sequence to complete the call establishment. The training is performed at the symbol rate indicated by the received SVD AID signal. As noted above, the calling SVD-compatible modem indicates its highest requested symbol rate as part of the particular SVD CNG or SVD/FAX CNG calling signal. The answering SVD-compatible modem then detects the symbol rate request of the calling modem by simply identifying the calling signal. The answering SVD-compatible modem then sets its operating symbol rate to either that rate or its own requested rate, if lower. The answering SVD-compatible modem indicates its operating symbol rate as part of the SVD AID signal and proceeds with training at that rate.

As a result of the detection of the SVD AID signal, CPU 105 of voice-data-fax modem 100 provides a control signal to fax modem 130, via line 107. In particular, after call establishment in step 430, voice-data-fax modem 100 (and also voice-data-fax modem 300) places fax modem 130 "on-line," in step 450, so that it appears to fax machine 15 that there is a connection to remote fax machine 35. For example, at this point, fax modem 130 provides a fax answer tone, as though it were provided by fax machine 35. Similarly, voice-data-fax modem 300 first provides a ringing signal, via its telephone network simulator, to fax machine 35. Any fax answer tone provided by fax machine 35 is blocked by the fax modem of voice-data-fax modem 300.

Conversely, if an industry standard answer tone is received in step 425 before reception of any SVD AD signal, then it is assumed that the answering modem is not SVD-compatible. If a standard answer tone is detected, voice-data-fax modem 100 disconnects in step 440. It should be noted that if voice-data-fax modem 100 were only completing a data call, i.e., no voice call or fax call, then voice-data-fax modem 100 could switch to an industry standard data modulation, like CCIIT V.32, to complete the call in step 440 instead of performing a disconnect.

Figure 5:
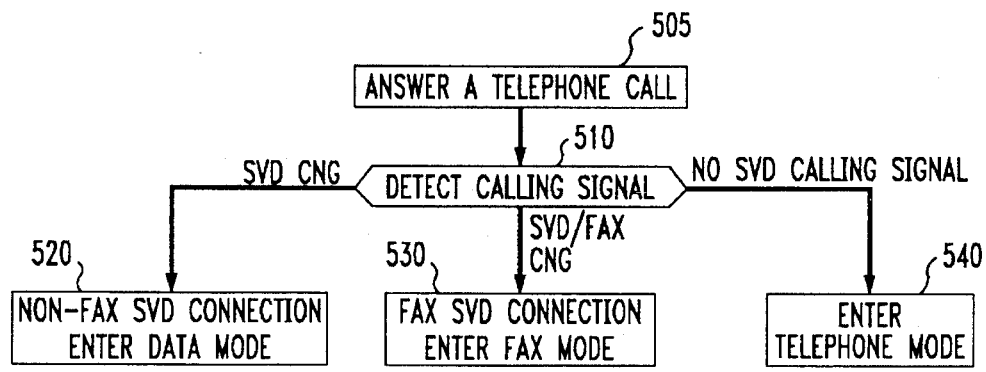
FIG. 5 shows an illustrative method for use in an answering SVD-compatible modem for establishing a simultaneous voice and fax connection.

FIG. 5 shows an illustrative method for use in voice-data-fax modem 100 when answering an incoming telephone call. CPU 105 of voice-data-fax modem 100 answers an incoming telephone call in step 505 via SVD modem 120. The latter provides to CPU 105, via line 108, signaling that represents whether an SVD calling signal has been detected, and if so what type of SVD calling signal. If SVD modem 120 detects the calling signal SVD CNG, then CPU 105 switches to a non-fax mode of operation, i.e., an SVD data mode in step 520. If SVD modem 120 detects the calling signal SVD/FAX CNG, then CPU 105 switches to a fax mode of operation in step 530. In the fax mode of operation, CPU 105 enables fax modem 130 to an "on-line" state and controls loop simulator 135 to provide a ringing signal to fax machine 15. Finally, if no SVD calling signal is detected by SVD modem 120, then CPU 105 instructs SVD modem 120 to connect telephone 20 to PSTN 200 in step 540.

Figure 6:
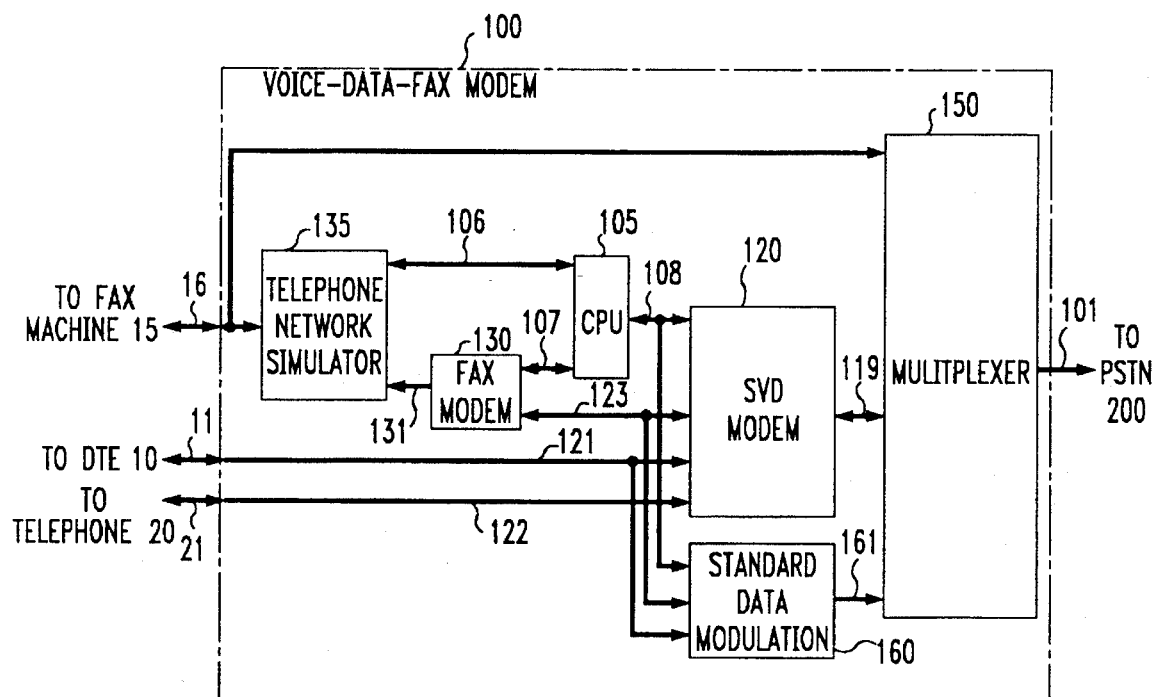
FIG. 6 shows a block diagram of another embodiment of the voice-data-fax modem of FIG. 1 embodying the principles of the invention.

Another embodiment of voice-data-fax modem 100 is shown in FIG. 6. As described above, when voice-data-fax modem 100 detects something other than an SVD answer identification signal, for simplicity, the telephone call was disconnected. However, as shown in FIG. 6, instead of disconnecting from any non-SVD data or fax connection, SVD modem 100 can, instead, simply switch to a respective operating mode and complete the call establishment as is known in the art. The only differences between FIG. 6 and FIG. 2 are the addition of multiplexer 150, and standard data modulation element 160. Normally, multiplexer 150, under the control of CPU 105, couples telephone line 101 to SVD modem 120, which detects ringing, searches for an answer signal, etc. Standard data modulation element 160 provides CCITT standard data modulation functionality, like V.32.

When originating a data, or fax, telephone call, voice-data-fax modem 100 initially attempts the connection in an SVD mode, e.g., non-fax or fax. However, instead of disconnecting as shown in FIG. 4 when receiving a standard answer tone, CPU 105 now switches to the respective mode of operation. For example, if attempting a fax call, which is signaled by fax machine 15 going off-hook, CPU 105 switches to a fax mode of operation. Referring back to FIG. 3 briefly, if a standard answer tone is detected by SVD modem 120, CPU 105 then switches multiplexer 150 to couple telephone line 101 directly to telephone line 16 instead of disconnecting as shown in step 440. This allows the far-end fax machine to communicate directly with fax machine 15. On the other hand, if attempting a data call, which is signaled by, e.g., request-to-send activity from DTE 10, CPU 105 enters a data mode of operation so that when standard answer tone is detected, instead of disconnecting as shown in step of FIG. 3, CPU 105 switches multiplexer 150 to couple telephone line 101 to standard data modulation element 160 for call establishment using a standard CCITT data modulation like V.32. This embodiment allows voice-data-fax modem 100 to provide a broader range of data and fax services to a user.

It should be noted that if either modem subsequently requests a complete system retrain, this retrain includes the SVD CNG and SVD AID signals. However, the SVD/FAX CNG calling signal is never sent as part of a system retrain. Each retrain will request the next lower symbol rate, if performance history indicates that such a lower rate may be warranted. Retraining typically is requested and identified by the transmission and reception, respectively, of a unique bit pattern.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., SVD modem 120, fax modem 130, etc., the functions of any one or more of those building blocks can be carried out using one or more appropriate programmed processors, e.g., a digital signal processor.

In addition, the technique is applicable to converting standard data modulations like CCITT V.32 to an SVD modulated signal. For example, fax modem 130 of FIG. 2 can be replaced by a V.32 data modem. Also, in the embodiment of FIG. 6, the re-modulation of the fax information provided by fax modem 130 could be performed by standard data modulation element 160 as shown by line 123 of FIG. 6. Finally, multiplexing of the fax signal, from fax machine 115, and a data signal, from DTE 10, would allow simultaneous transmission of voice, data, and fax signals in an SVD-compatible modem.

I claim:

1. A method for use in data communications equipment, the method comprising the steps of:

answering a telephone call;

detecting a first identification signal that identifies a far-end modem as providing fax information within a simultaneous voice and data signal;

sending a second identification signal that identifies the data communications equipment as compatible with the far-end modem;

switching to a fax mode of operation;

receiving the simultaneous voice and data signal;

demodulating the data portion of the simultaneous voice and data signal to provide a data signal;

demodulating the voice potion of the simultaneous voice and data signal to provide a voice signal;

modulating the data signal to provide a fax modulation signal; and transmitting the fax modulation signal.

2. The method of claim 1 wherein the first identification from the far-end modem and the second identification from the data communications equipment also represent a requested symbol rate.

3. The method of claim 1 wherein the step of sending the second identification signal includes the step of sending a standard answer tone after sending the second identification signal.

4. A method for use in a simultaneous voice and data communications system, the method comprising the steps of:

receiving an off-hook signal from a fax machine;

coupling to a communications channel to dial a telephone number that represents a far-end fax machine;

transmitting a calling signal to the communications channel that represents both a mode of operation and a requested symbol rate subsequent to dialing the telephone number;

accepting a fax signal from the fax machine upon receiving an identification signal from a far-end data communications equipment of the far-end fax machine, the identification signal confirming the requested symbol rate, where the identification signal is received before a standard answer signal;

demodulating the fax signal to provide fax data; and re-modulating the fax data for transmission to the far-end data communications equipment.

5. Apparatus for use in data communications equipment, the apparatus comprising:

means for a) answering a telephone call, b) detecting a first identification signal that identifies a far-end data communications equipment as providing a simultaneous voice and data signal wherein the data signal represents fax information, and c) providing a second identification signal in response to the first identification signal;

means for demodulating both the data portion of the simultaneous voice and data signal to provide a data signal, and the voice portion to provide a voice signal;

means for modulating the data signal to provide a fax modulation signal; and means for transmitting the fax modulation signal.

6. The apparatus of claim 5 wherein the first identification and the second identification each represent a requested symbol rate from the respective endpoint.

7. The apparatus of claim 5 wherein the means for providing the second identification signal also sends a standard answer tone after sending the second identification signal.

8. A modem comprising:

a processor responsive to a calling signal received from a telephone line for selecting one of a number of operating modes, wherein one of the number of operating modes is a fax mode and another one of the number of operating modes is a simultaneous voice and fax mode;

a fax modem circuit for demodulating a fax signal to provide a data signal;

a simultaneous voice and data modem circuit for remodulating the data signal along with a voice signal to provide a simultaneous voice and data signal for transmission over a telephone line; and a selecting circuit responsive to the selected mode for coupling the fax signal to the telephone line during the fax mode and for coupling the simultaneous voice and data signal to the telephone line during the simultaneous voice and fax mode.

* * * * *